July 29, 1952        R. E. SCHULZ        2,604,804
SELF-EQUALIZING DRIVING CHUCK
Filed Dec. 23, 1948        2 SHEETS—SHEET 1
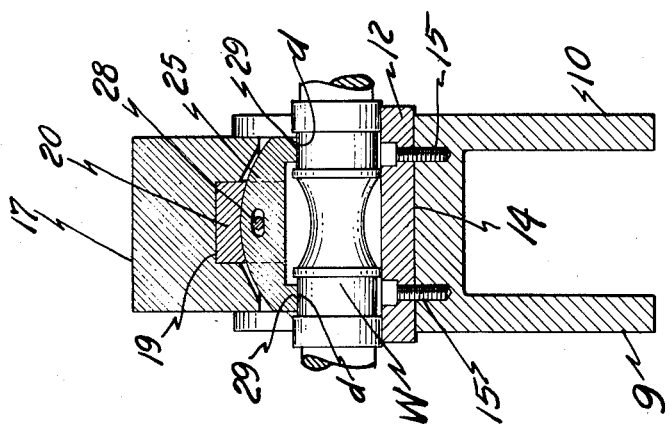
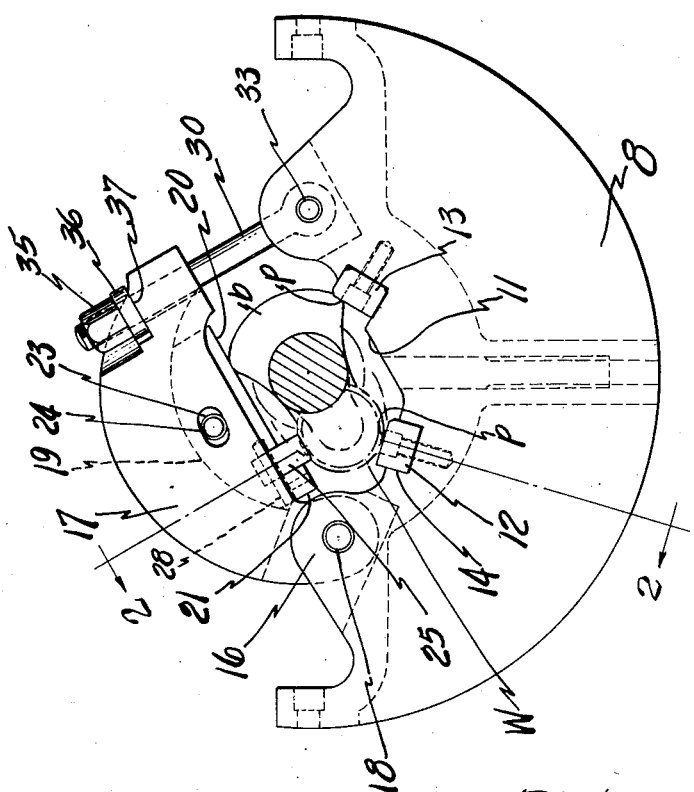
INVENTOR.
Richard E. Schulz.
BY Frank C. Farman.
ATTORNEY July 29, 1952         R. E. SCHULZ         2,604,804
SELF-EQUALIZING DRIVING CHUCK Filed Dec. 23, 1948         2 SHEETS—SHEET 2

INVENTOR.
Richard E. Schulz.
BY
Frank C. Karman
ATTORNEY

Patented July 29, 1952

2,604,804

UNITED STATES PATENT OFFICE 2,604,804

SELF-EQUALIZING DRIVING CHUCK

Richard E. Schulz, Saginaw, Mich., assignor to Wickes Bros., a division of The Wickes Corporation, Saginaw, Mich.

Application December 23, 1948, Serial No. 66,965

5 Claims. (Cl. 82—40)

This invention relates to driving chucks for lathes, and is more particularly related to the operation of center drive chucks for center drive lathes, and by means of which both rough and premachined surfaces of a workpiece are engaged and clamped for driving during the machining thereof.

One of the prime objects of the invention is to design a driving chuck which includes means for automatically equalizing the clamping means for positively securing and locking the workpiece in position against slippage or dislocation.

Another object is to design a chuck including floating, automatic equalizing means which are automatically adjusted when the chuck is locked, for positively and securely locking the workpiece in position.

A further object is to provide a chuck including counterweight equalizing means engageable with the workpiece, and a pin bearing equalizer member associated therewith, so that the workpiece will be firmly gripped and held in locked position.

Still a further object is to design a chuck which can be economically manufactured and assembled, which automatically adjusts itself to compensate for scale or rough surfaces on the workpiece, and which firmly secures the workpiece in position.

Still a further object of the invention is to design a positive and effective clamping chuck which is rapid in action, and which can be operated with a minimum of effort by the operator.

Still a further feature of the invention is to provide a chucking device including adjustable locating lands or means on the chuck body engageable with premachined areas on the workpiece, and provide suitable automatic equalizing means operable in cooperation therewith for securely clamping the workpiece to the work-engaging members of the chuck while holding it in true located position on the axis of rotation of the lathe.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit or sacrificing any of the advantages of the invention.

In the drawings:

Fig. 1 is an end-elevational view of my new driving chuck showing a workpiece locked in position therein.

Fig. 2 is a section taken on the line 2—2 of Fig. 1.

Figure 3:
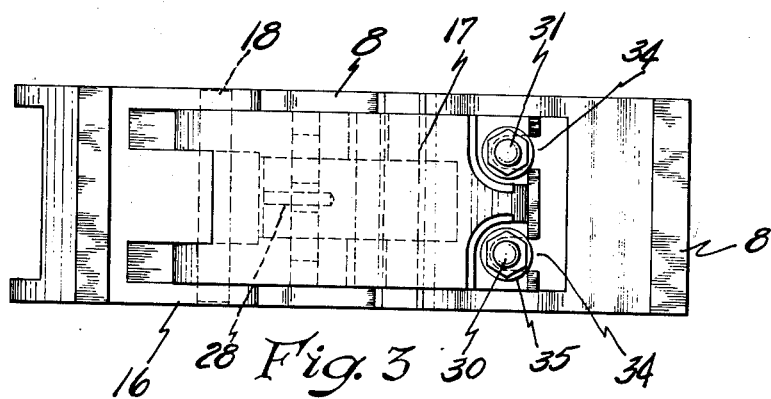
Fig. 3 is a top, plan view.
Figure 4:
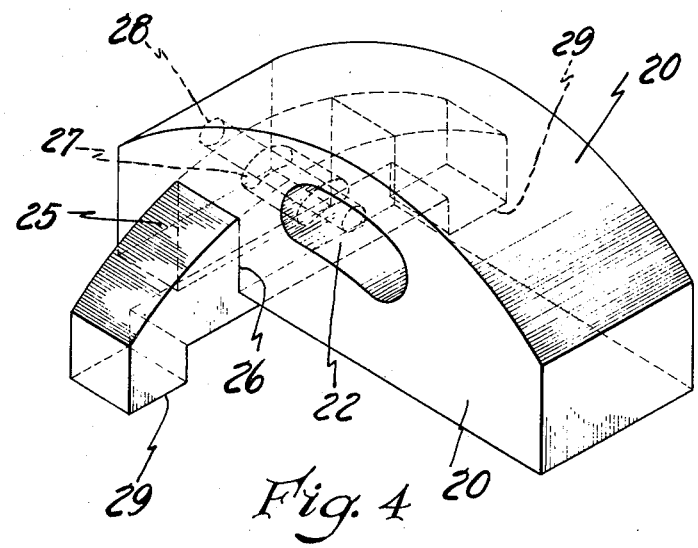
Fig. 4 is an enlarged, isometric view showing the compensating blocks or bars.

Referring now more specifically to the drawings in which I have shown the preferred embodiment of my invention, the numeral 8 indicates the chuck body, which is formed as clearly shown in Fig. 1 of the drawings. This is preferably circular in shape, and is formed with spaced-apart web sections 9 and 10, the upper face 11 being curved as shown to accommodate a workpiece W as usual.

Radially disposed lands 12 and 13 are mounted in sockets 14 provided in the face 11 of the chuck, these lands being adjustable by means of bolts 15, to properly position the workpiece and insure true axial alignment of the work in the lathe.

Cheeks 16 are cast integral with the chuck body 8, and a cap member 17 is hingedly secured thereto by means of the hinge pin 18, the inner face of the cap being circumferentially grooved as at 19, and slidably accommodates a counterweight equalizer block or bar 20, the upper surface of which is curved to conform to the inner wall of said groove, and a depending shoulder 21 is formed on the inner end of said bar, a transversely disposed bolt opening 22 being provided in the bar as shown, and complementary slotted openings 23 are provided in the side walls of the cap in alignment therewith to accommodate the bolt 24, so that the bar may automatically circumferentially adjust itself to compensate for scale, rough surfaces, etc.

A transversely disposed, automatically adjustable pin bearing block or bar 25 is rockably mounted in a passage 26 provided in the bar 20, the upper surface being curved as shown, and a slotted opening 27 is provided in said bar, a pin 28 being mounted in the bar 20 and projecting through said opening for securing it in position and permitting shifting thereof to provide proper bearing on the work.

Downwardly projecting abutments 29 are formed integral with and on the opposed ends of the bar 25, and engage a peripheral locating area d of the workpiece pin bearings, this bar being rockable about the pin 28 to compensate for inequalities, scale, rough surfaces, etc. on the workpiece.

Eye bolts 30 and 31 are pivotally secured to the main body 8 by means of the pin 33, and engage bifurcated openings 34 provided in the free end of the cap, these eye bolts being threaded as usual to accommodate nuts and washers 35 and 36 respectively, which bottom against the shouldered sections 37 of the cap for securely clamping the cap and the workpiece in position.

Applicant wishes to direct particular attention to the fact that the pre-machined areas p are on the crankshafts when received by the manufacturer for rough and finish turning as done on conventional crankshaft lathes in general. These areas are machined by the crankshaft producer, and vary in size and shape, so that accurate running balance of the crankshaft will not be disturbed; and to conform to the specifications submitted by the various manufacturers, automobile manufacturers being the largest users. The chucks are designed to fit these pre-machined areas, and the lands are radially adjustable so that the crankshaft can be adjusted and held in true axial alignment in the lathe.

In practice, the lands 12 and 13 are first set to suit the particular workpiece to be machined, and with the cap in open position, the work is placed in position, with the pre-machined areas p in engagement therewith; the cap 17 is then swung down to bring the counterweight equalizer bar 20 into engagement with the counterweight section b of the workpiece, and the bar 25 into engagement with the peripheral locating areas d of the workpiece.

The operator then tightens down on the nuts 35 to firmly clamp the workpiece; the counterweight equalizer bar 20 automatically adjusting itself, as does also the bar 25, so that firm, positive and balanced gripping action is secured, eliminating any possibility of shifting or slippage during the workpiece cutting cycle, and eliminating the possibility of so-called "hogging in" or wrecking of the machine.

From the foregoing description, it will be obvious that I have perfected a very simple, practical and efficient means for equalizing the work-gripping means and positively locking it in position in the lathe.

What I claim is:

1. In a bearing device of the character described comprising a bearing body adapted to accommodate a crankshaft to be machined, a cap member hingedly connected to said bearing body and formed with a longitudinally disposed circular groove in the inner face of said cap, a counterweight equalizer bar automatically adjustable in said groove with its lower face engageable with said crankshaft at a point directly adjacent the one end of said equalizer bar, said bar being formed with a transversely disposed groove directly adjacent the hinged end of the cap, a pin bearing bar automatically adjustable in said transversely disposed groove for engagement with said crankshaft at a point spaced transversely from the point of engagement of the equalizer bar, and means for releasably securing the free end of the cap to said bearing body.

2. The combination defined in claim 1 in which the upper edge of the equalizer bar is curved to fit the circular groove in the cap member, and the lower edge of the equalizer bar projects below the lower edge of the cap.

3. The combination set forth in claim 1 in which downwardly projecting abutments are provided on the opposite ends of the pin bearing bar for engagement with the crankshaft at spaced-apart points.

4. The combination defined in claim 1 in which depending abutments are provided on the lower face of the bar at the opposite ends thereof, a transversely disposed slotted opening in the pin bearing bar, and a pin in said equalizer bar and extending through said slotted opening to permit limited rocking movement of said pin bearing bar with relation to the equalizer bar.

5. The combination set forth in claim 1 in which a slotted, longitudinally curved passage extends transversely through said equalizer bar, and a bolt mounted in said cap and extending through the slotted passage in the equalizer bar to permit limited movement of the equalizer bar in the circular groove in said cap.

RICHARD E. SCHULZ.

REFERENCES CITED

The following references are of record in the file of this patent:

UNITED STATES PATENTS

| Number | Name | Date |
|---|---|---|
| 2,109,371 | Groene | Feb. 22, 1938 |
| 2,188,594 | Groene | Jan. 30, 1940 |
| 2,322,623 | Floeter | June 22, 1943 |
| 2,354,009 | Groene | July 18, 1944 |
| 2,354,258 | Groene | July 25, 1944 |
| 2,397,164 | Shafer | Mar. 26, 1946 |
| 2,498,011 | Sherbondy | Feb. 21, 1950 |